Aug. 29, 1933. J. W. HUGHES 1,924,405
GENERATING ODONTOGRAPH
Filed Sept. 18, 1930 2 Sheets-Sheet 1
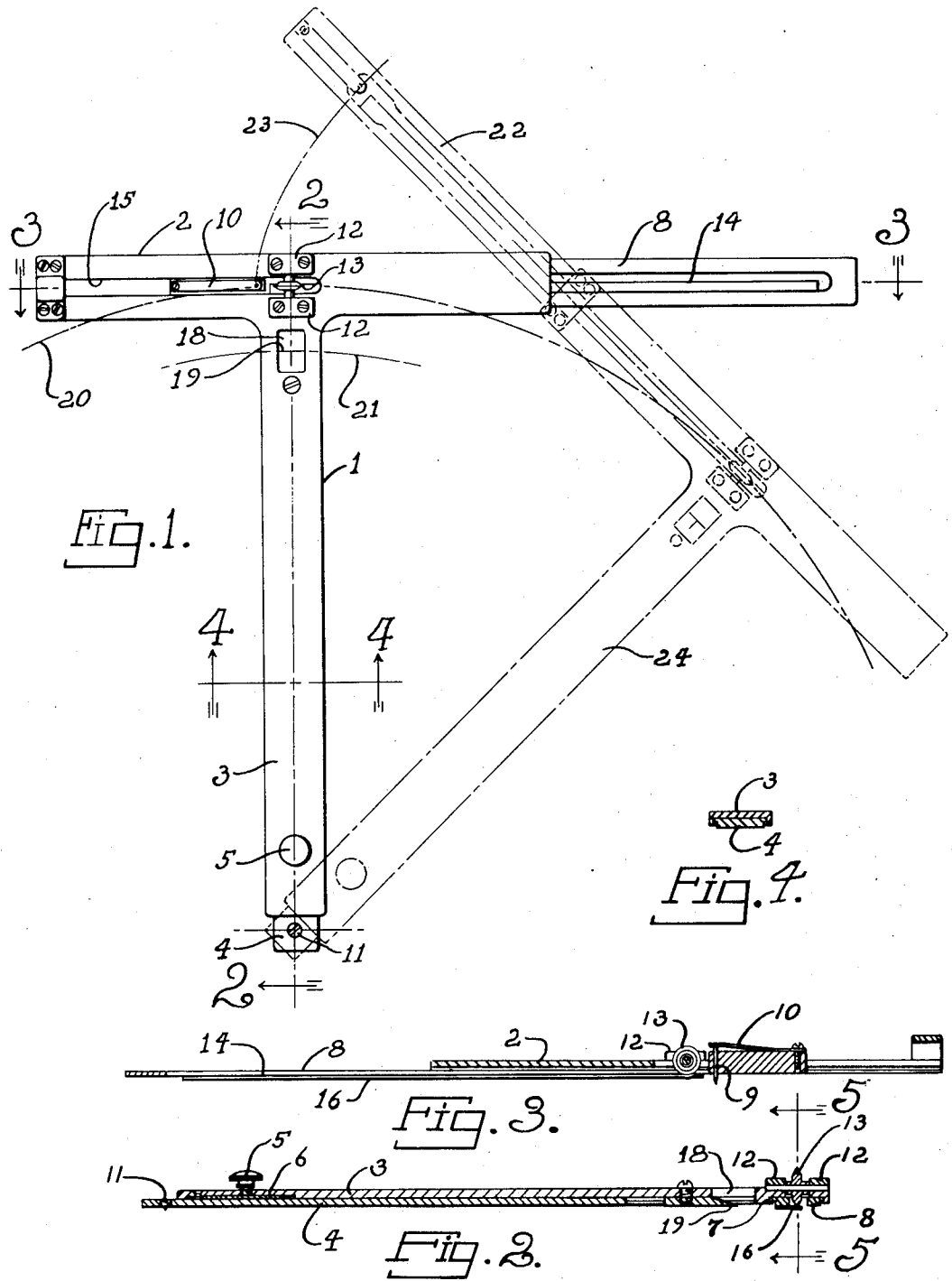
INVENTOR
JAMES W. HUGHES.

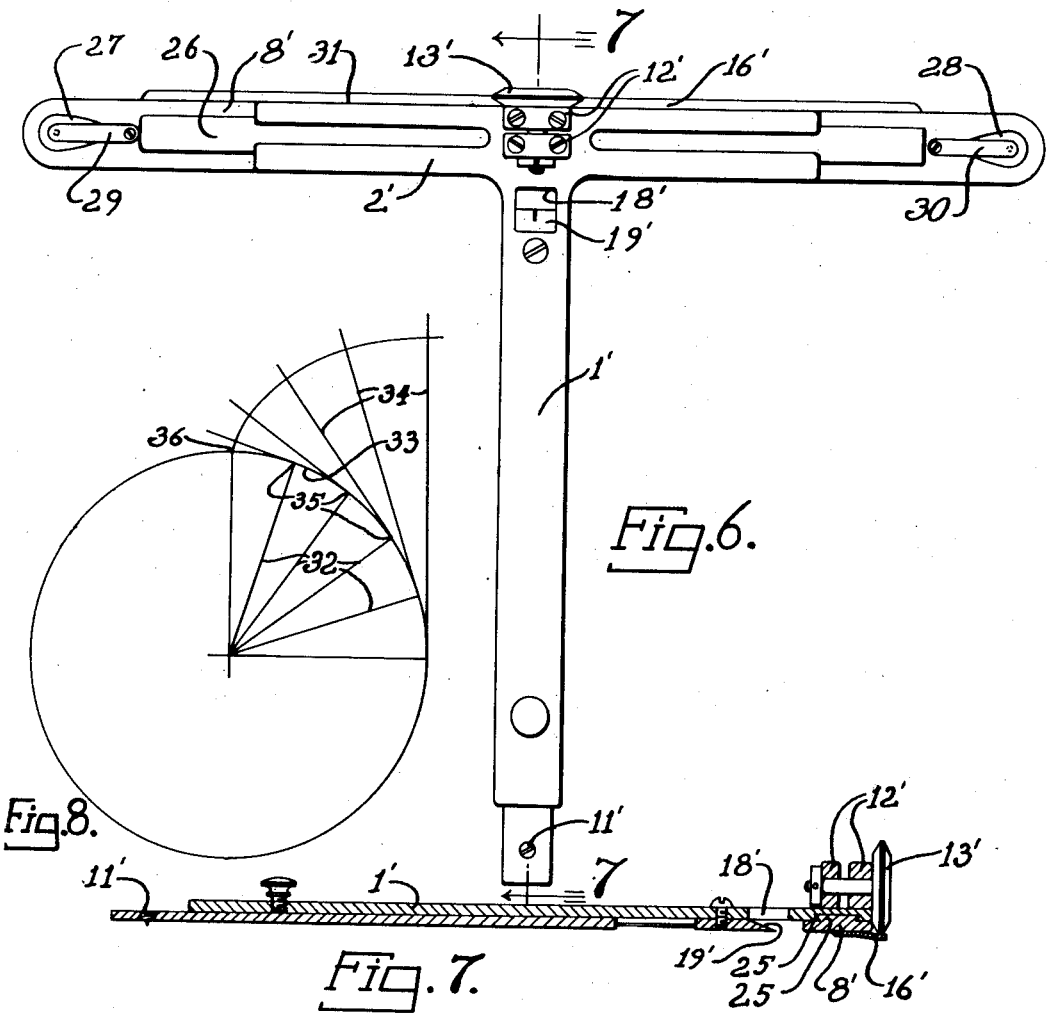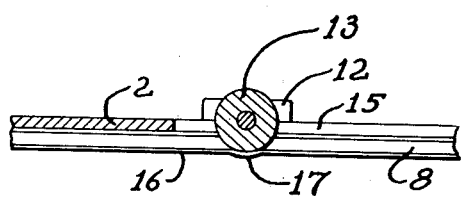

Patented Aug. 29, 1933

1,924,405

UNITED STATES PATENT OFFICE 1,924,405

GENERATING ODONTOGRAPH

James W. Hughes, Detroit, Mich., assignor to Chrysler Corporation, Detroit, Mich., a corporation of Delaware Application September 18, 1930
Serial No. 482,788

12 Claims. (Cl. 33—27)

This invention relates to an instrument for generating an involute curve and describing the same on a drawing.

The main objects of the invention are to provide a portable instrument of this kind which may be operated upon a paper sheet or Bristol board having a drawing thereon so as to allow the curve to be applied directly to the drawing; and to provide a device of this type which is adapted to be selectively positioned so as to apply the curve at a predetermined location on the drawing.

Further objects of the invention are to provide a generating odontograph which is particularly adapted for developing the curvature of an involute gear tooth on the layout of the gear; to provide an instrument of this kind which may be adjustably conditioned for laying out the involute gear teeth of gears of various diameters; to provide an involute curve generating device by which a previously developed involute curve may be conveniently checked; to provide means in a device of this kind for conveniently locating the curve describing element in a predetermined position with respect to a base circle of a gear layout; and to provide an odontograph by which the reverse curvatures of the respectively opposite sides of involute gear teeth may be conveniently outlined.

An illustrative embodiment of my invention is shown in the accompanying drawings, in which:

Fig. 1 is a plan view of an odontograph illustrating the operation thereof by which an involute curve is formed.

Fig. 2 is a longitudinal vertical section taken on the line 2—2 of Fig. 1.

Fig. 3 is a transverse vertical section taken on the line 3—3 of Fig. 1.

Fig. 4 is a transverse section taken on the line 4—4 of Fig. 1.

Fig. 5 is an enlarged vertical section taken on the line 5—5 of Fig. 2.

Fig. 6 is a top plan view of an odontograph embodying a modified form of my invention.

Fig. 7 is a vertical section taken on the line 7—7 of Fig. 6.

Fig. 8 is a diagrammatic illustration showing a conventional development of an involute curve.

Heretofore, in laying out involute gear teeth, it has been customary to develop the involute curves by one of the well-known geometric methods, such as that shown in Fig. 8. Methods of this type require measurements of arcuate distances to be laid off on tangential construction lines. Accurate measurements of this type are difficult to obtain and therefore it is the practice to use a cord of the arc as a unit of measurement. This procedure results in the formation of curves which are only approximately accurate and frequently gives rise to sufficient error to cause excessive interference between the teeth of the gears made in accordance with the drawing. In order to check a curve that has been developed geometrically, a similar process is followed at the expense of considerable time and without complete satisfaction that the final work is accurate.

An involute curve is defined as being the path of any point on a tangent to a curve that rolls without sliding around the curve. The involute curvature of gear teeth has a circular generating curve. In practice, the base circle of the gear is used as the generating curve upon which a tangent is, in effect, rotated without sliding.

In the form shown, the improved involute generating instrument includes a T-shaped rotatable member having an extensible radius arm 1 and a head 2 which is perpendicular to the length of the radius arm. The radius arm is formed of a pair of relatively slidable sections 3 and 4 that are fixed in a selected relation by a thumb screw 5 which is threaded in the section 3 and which bears upon a pressure plate 6. The pressure plate 6 is carried by the section 3 and it frictionally engages the upper surface of the extensible section 4, as shown in Fig. 2.

Formed in the lower side of the head 2 of the instrument is a dovetailed groove 7 in which a slide or bar 8 is shiftably mounted. The bar 8 is substantially longer than the head 2 of the instrument and it is provided at its left end, as in Fig. 1, with a marker such as a pencil lead 9 which is resiliently urged against the surface upon which the instrument is supported by a spring 10. The extensible section 4 of the radius arm 1 has a sharp pointed pivot 11 on its outer extremity which forms an axis about which the instrument is swingable. The lower side of the slide 8 extends in advance of the corresponding side of the head 2 forming a support for the free end of the instrument.

Journaled in bearings 12, located at the junction of the radius arm 1 and the head 2 is a roller 13 which extends through registering slots 14 and 15 in the slide 8 and head 2, respectively. The periphery of the roller 13 bears upon a flexible tape 16 which is secured to the lower surface of the slide 8 and which has exposed edge portions in registration with the groove 14. The roller 13 extends downwardly beyond the normal plane of the flexible tape 16 and bulges the portion of the tape with which it contacts downwardly as shown at 17 in Fig. 5. A slot 18 formed in the sections 3 of the radius arm 1 has a beveled edge 19 which is located at a known distance from the crown of the periphery of the roller 13 so as to enable the instrument to be accurately positioned with respect to the base circle of a gear layout.

In operation, the odontograph is placed upon a drawing on which a circle or arc 20 has been formed, the pivot 11 being placed at the center of the curvature of the arc. The thumb screw 5 is then released so as to permit the radius arm 1 to be extended until the crown of the roller 13 registers with the circumference of the arc. This seating of the radius arm may be conveniently accomplished by providing a concentric arc 21 on the drawing which has a radius that is shorter in length than the radius of the base circle, an amount equal to the known distance between the bevel edge 19 of the instrument and the crown of the roller. After the bevel edge 19 has been placed in alinement with the arc 21, the thumb screw 5 is tightened to fix the length of the radius arm 1.

The slide 8 is then shifted relative to the head 2 until the marker 9 coincides with the point from which the involute curve is intended to be drawn. Then the instrument is rotated in a clockwise direction, as viewed in Fig. 1, while pressing the central portions of the head 2 firmly upon the surface of the paper upon which the curve is being formed. The pressure upon the head of the instrument firmly holds that area of the flexible tape 16 which the roller 13 bulges downwardly, in frictional engagement with the surface of the paper so as to prevent the slide 8 from sliping or sliding relative to the locus of the roller during rotation of the instrument. The roller 13 rolls upon the tape during rotation of the instrument and successively bulges the adjacent portions of the tape outwardly in the manner shown in Fig. 5, thereby causing the slide to, in effect, roll without sliding upon the circumference of the base circle. During this movement of the instrument, the left end portion of the slide 8 is projected outwardly from the head 2, as illustrated in dotted lines at 22 in Fig. 1 and the marker 9 describes the involute curve illustrated at 23. In order to check the curve, the instrument is rotated from its dotted line position, shown at 24 in Fig. 1, to its initial position and if the marker follows the same path during the return stroke of the instrument, it is substantially certain that the curve described is a true involute.

In the form shown in Figs. 6 and 7, an odontograph is illustrated having a marker at the respectively opposite ends of the slide so as to enable the describing of involute curves of reverse curvatures with a single instrument.

The instrument shown in Fig. 7 includes an extensible radius arm 1' and a perpendicularly transverse head 2' which are of the same general construction as the corresponding parts of the device shown in Fig. 1, with the exception that the head 2' is provided on its lower side with a dovetailed groove 25 in which the dovetailed tongue 26 of a slide 8' is shiftably mounted. This slide is provided with slots 27 and 28 in its respectively opposite ends in which markers 29 and 30 of the form shown in Fig. 3 are located. The head 2' is provided at its central portions with a roller 13' which is supported on a shaft that is journaled in bearings 12'. The roller 13' is located in advance of the outer edge 31 of the head portion 2' and its periphery bears against a flexible tape 16' which is secured to the lower side of the slide 8' and which extends outwardly beyond the edge 31 of the head portion. The roller 13' normally bulges the portion of the flexible tape with which it contacts downwardly, as viewed in Fig. 7, forming a bearing point between the lower side of the tape and the surface of the drawing paper upon which the instrument is placed during operation, at which sufficient friction exists to hold the slide against slipping or sliding relative to the path in which the roller travels during oscillation of the instrument about its pivot 11'. The radius arm 1' is provided with a slot 18' which has a beveled edge 19' located at a known distance from the crown of the periphery of the roller so as to enable accurate placement of the instrument with respect to the base circle of a gear layout in the manner described above.

In the operation of this form of my invention, one of the markers is preferably rendered inoperative by placing a wedge or other suitable means under the spring thereof so as to hold the marker out of engagement with the paper. When it is desired to form the curvature of the right side of a tooth, the left marker 29 is rendered inoperative in this way and the instrument is rotated in a clockwise direction, as viewed in Fig. 6. To check the curve thus described, the instrument is then returned to its starting position so as to determine whether the marker follows the same course during both directions of rotation. The curvature of the left side of the tooth may be formed in the manner described in connection with Fig. 1 while holding the marker 30 of the right end of the slide out of contact with the paper.

With either of these forms of my invention, an involute curve may be quickly and accurately generated at any desired location on a gear layout or other drawing and previously developed involute curves may be readily checked. Considerable time is saved by obviating the necessity of repeatedly constructing an involute curve on a drawing by one of the conventional geometric methods, such as illustrated in Fig. 8 in which a plurality of radii 32 which subtend equal arcs 33 are first constructed and then tangents 34 to these arcs are drawn at the intersections 35 of the arcs and the radii. On each tangent, the accurate distance from a given point 36 on the circle, to the intersection is stepped off so as to, in effect, trace the end of a straight edge as it is rolled upon a circle. The inaccuracies encountered in measuring the arcuate distances introduce substantial errors which are not encountered in the use of my improved instruments.

Although but two specific embodiments of this invention have herein been shown and described, it will be understood that various changes in the size, shape and arrangement of parts may be made without departing from the spirit of my invention and it is not my intention to limit its scope other than by the terms of the appended claims.

What I claim is:

1. An instrument for developing an involute curve upon a plane surface including a rotatable member, a transverse slide mounted on said member having a substantially flexible face engageable with said surface, and means for compressing successive limited areas of said face against said surface so as to prevent slipping of said slide in a course tangent to the locus of a point on said member during rotation of the latter.

2. An instrument for developing an involute curve on a plane surface including a rotatable radius arm having a pivot, a perpendicularly transverse slide shiftably mounted on said radius arm in spaced relation to said pivot and having a substantially flexible face receivable on said plane surface for supporting one end of said arm, and means for compressing successive limited areas of said face against said surface so as to prevent slipping of said slide in a course tangent to the locus of a point on said arm during rotation thereof.

3. An instrument for developing an involute curve upon a plane surface including an oscillatable radius arm, a transverse slide shiftably mounted on said arm forming a support for one end portion thereof and having a substantially flexible portion, a marker on said slide, and means for compressing successive limited areas of the flexible portion of said slide against said surface so as to prevent slipping of said slide in a course tangent to the locus of a point on said arm during rotation of the latter.

4. An instrument for developing an involute curve upon a plane surface including an oscillatable radius arm, a transverse slide shiftably mounted on said arm having a substantially flexible face engageable with said plane surface for supporting one end portion of said instrument thereon, and a roller journaled on said arm having its periphery in rolling contact with said face and adapted to compress successive limited areas of the latter against said plane surface for holding said slide against slipping in a course tangent to the arc described by said roller during rotation of said arm.

5. A generating odontograph including a rotatable radius arm, a transverse slide slidably mounted on said arm, a flexible tape on the lower side of said slide for supporting the latter on a plane surface and a roller journaled on said arm having its periphery in rolling contact with said tape for pressing successive adjacent areas thereof against a plane surface so as to hold said slide against slipping in a tangent course relative to the path of said roller during rotation of said arm.

6. A generating odontograph including a rotatable radius arm, a transverse slide slidably mounted on said arm, a flexible tape on said slide, and a roller journaled on said arm and bearing outwardly on said tape, the periphery of said roller protruding beyond the normal plane of said tape so as to bulge the latter outwardly at a limited area.

7. In a generating odontograph, a rotatable radius arm, a pivot on one end of said radius arm, a slide shiftably mounted on the other end thereof having a substantially flat flexible face for supporting one end of said odontograph on a plane surface, said arm having guiding elements thereon for constraining the movement of said slide to a path perpendicular to the longitudinal axis of said arm, and means for pressing successive limited areas of said flexible face upon said plane surface so as to hold said slide against slipping in a course tangent to the locus of a point on said arm during rotation of the latter.

8. In a generating odontograph, an extensible radius arm including a pair of slidably connected sections, a pivot on one of said sections, a slide mounted on the other section having a substantially flexible face for supporting one end of said odontograph on a plane surface, said slide being shiftable perpendicularly with respect to the longitudinal axis of said arm, means for pressing successive limited areas of said slide against said plane surface for preventing slipping of said slide in a course tangent to the locus of a point on said arm during rotation of the latter, and means for fixing the sections of said arm in a selected relation so as to predetermine the radius of the locus of said point.

9. A generating odontograph including a T-shaped oscillatable member having a radius arm and a perpendicular head portion, a pivot on one side of said radius arm spaced from said head portion, a bar slidably mounted on said head portion forming a support therefore during oscillation of said member about said pivot, a marker on said bar, a flexible tape on the supporting side of said bar having an exposed edge portion, and a roller journaled on said T-shaped oscillating member engaging the exposed edge portion of said flexible tape for holding a limited area thereof in frictional engagement with a supporting surface so as to prevent sliding of said bar relative to the path of said roller.

10. An instrument for developing an involute curve on a substantially plane surface including a rotatable radius arm, a slide mounted on said arm, said slide having a flexible face receivable on said plane surface said slide being shiftable perpendicularly with respect to the length of said arm, a pair of markers, one at each end of said slide, and means for pressing successive limited areas of said face against said surface so as to prevent slipping of said slide in a course tangent to the locus of a point on said radius arm during rotation of the latter.

11. In a generating odontograph, an extensible radius arm including a pair of slidably connected sections, a pivot on one of said sections, a slide mounted on the other section, said slide being shiftable perpendicularly with respect to the longitudinal axis of said arm, a flexible tape on said slide, and a roller journaled on said arm and bearing outwardly on said tape, the periphery of said roller protruding beyond the normal plane of said tape so as to bulge the latter outwardly at a limited area.

12. In a generating odontograph, an extensible radius arm including a pair of slidably connected sections, a pivot on one of said sections, a slide mounted on the other section, said slide being shiftable perpendicularly with respect to the longitudinal axis of said arm, a flexible tape on said slide, a roller journaled on said arm and bearing outwardly on said tape having a periphery protruding beyond the normal plane of said tape for bulging the latter outwardly at limited areas so as to prevent slipping of said slide in a course tangent to the locus of said roller during rotation of said arm, and means for fixing the sections of said arm in a selected relation so as to predetermine the radius of the locus of said roller.

JAMES W. HUGHES.